United States Patent Office 3,246,328
Patented Apr. 12, 1966

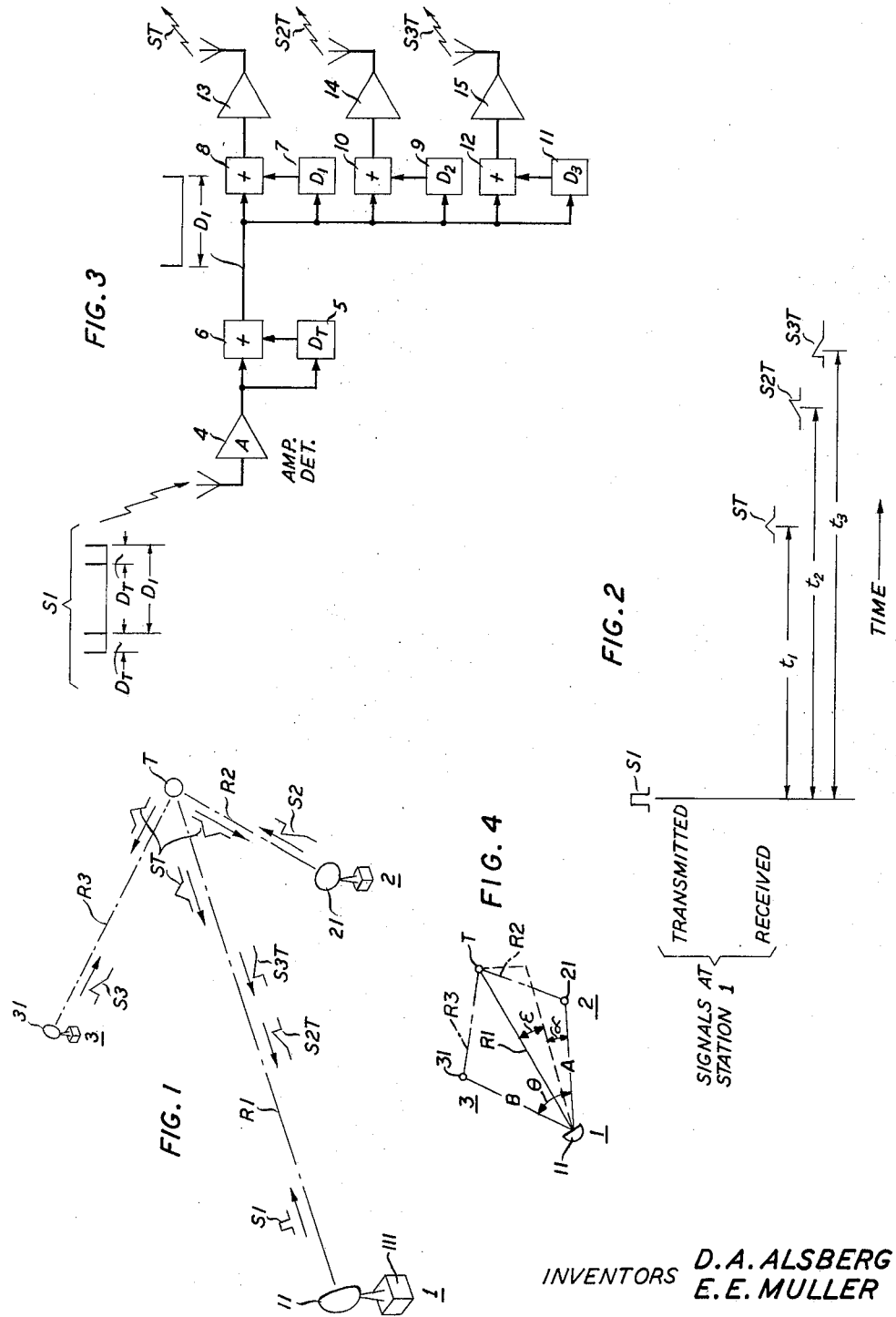

3,246,328
PRECISION RADAR SYSTEM
Dietrich A. Alsberg, Berkeley Heights, and Erwin E. Muller, Towaco, N.J., assignors to Bell Telephone Laboratories, Incorporated, New York, N.Y., a corporation of New York
Filed Dec. 7, 1961, Ser. No. 158,155
7 Claims. (Cl. 343—8)

This invention relates to tracking and guidance systems for objects in flight and more particularly to a means for improving the accuracy of the data for determining the transverse velocity components of said object.

This application is a simplified alternative to the means for determining the transverse velocity components disclosed in the copending application of applicants and D. R. Hagner, Serial Number 136,143, filed August 28, 1961. It was pointed out in that application that it was more difficult to obtain accurate instantaneous velocity data than to obtain accurate position data. Also while velocity measurements obtained by conventional radar means are quite accurate on a long term basis, they are subject to considerable short term errors. For precision long range tracking and guidance, short term velocity data are essential and, as further pointed out in the copending application, this is particularly true for the transverse velocity components at long ranges. Prior attempts to minimize the angular errors due to inaccurate transverse velocity data have included a plurality of radar observation points distributed down range and required coherent communication between the various points and the main radar station. The copending application discloses means that does not require coherent communication and the present application is a further simplification and improvement thereof for determining these velocity components.

It is an object of this invention to improve the accuracy of the data used for determining the transverse velocity components of an object in long range flight.

This invention achieves this object by a system comprising a conventional radar station having a computer and two laterally disposed down range transponder stations. The object in flight carries a transponder that responds to the radar signal by emitting a signal which is received by all three stations. The two transponder stations emit signals in response to that emitted by the transponder in flight and these signals are relayed to the radar station by the transponder in flight. All the communications are via radar and transponder links so that no ground communication links are required. The radar computer yields the desired velocity components from the return data by conventional computer techniques.

The invention may be better understood by reference to the accompanying drawings, in which:

FIG. 1 schematically illustrates the system of this invention showing the relative positions of the radar and two transponder stations and the signal paths between them and the object in flight;

FIG. 2 is illustrative of typical signals transmitted and received by the radar from which the transverse velocity data may be derived;

FIG. 3 is illustrative of a typical transponder which may be carried by the object in flight; and FIG. 4 is a conventional illustration of the geometry of FIG. 1.

Referring to FIG. 1, a master radar station 1 and two transponder stations 2 and 3 are shown in a known spatial relationship. Each of these three stations should be understood to include conventional electrical equipment and an antenna structure. For example, the master station 1 comprises an antenna 11 and suitable supplementary radar gear, including a computer in its base structure 111, or other suitable data processing equipment, used for deriving the transverse velocity data as well as other data conventionally derived from radar signals. Stations 2 and 3 may comprise simple transponders, also of conventional design, and having antenna structures 21 and 31 respectively. The three antennas are shown coupled to an object in flight T by way of line of sight paths R1, R2 and R3. Associated with each of these paths are arrows indicating the directions of signals transmitted between the stations and the object in flight. Each of these arrows has associated with it a wave form which is to be considered purely symbolic of a signal of distinctive character. For example, signal S1 is shown as a square wave. This should not be taken to mean that the radar signal emitted from antenna 11 is a square wave but rather that this signal is distinguished from signal ST emitted by the transponder in the object in flight. This latter signal is shown as an equilateral triangle while the signals S2 and S3 emerging from antennas 21 and 31, respectively, are of different triangular wave forms. These different wave forms, as previously stated, are merely indicative of different characteristic signals. These may be different as to frequency or they may be of different forms of pulse modulation or may be distinguished by any other conventional means commonly used in this art.

As shown in FIG. 1, station 1 emits signal S1 which travels over path R1 to the object T. The transponder carried in object T immediately emits the transponder signal ST which is radiated in all directions and is received by all three stations, station 1 receiving its signal over path R1 and stations 2 and 3 receiving their signals over paths R2 and R3, respectively. As shown in FIG. 1, it is assumed that the object is closer to transponder station 2 than it is to transponder station 3 so that path R2 is assumed to be shorter than path R3. This, of course, is not to be understood to be a requirement as the paths may be equal or unequal in any order. However, under the assumed conditions, the signal ST over path R2 will be first received by transponder station 2 and its antenna 21 will be immediately caused to transmit a characteristic response signal S2 back to the transponder in object T. The transponder in object T immediately responds by relaying a characteristic signal S2T. For convenience of identification, signals S2 and S2T have been shown to have the same wave form in this illustration. Actually, these signals will be of different character so that signal S2 is not received directly by the radar station 1. Thus, it is apparent that the signal path from radar station 1 to transponder 2 must be via paths R1 and R2 and the return route must be via R2 and R1. Similarly, transponder signal ST reaches transponder station 3 by way of path R3 and transponder antenna 31 is caused to emit signal S3 which travels over path R3 to the transponder in the object T which responds by emitting signal S3T which travels over path R1 to the master radar 1. From the above description, it will be apparent that all communication links are between ground-to-air and air-to-ground paths and no communication paths exist directly between ground stations. Moreover, the signals need not be coherent.

In accordance with the conventional practice, antenna 11 will be highly directional. Antennas 21 and 31 may be either directional or omni-directional and it is preferable that the antenna structure for the transponder in object T be omni-directional.

By reason of the fact that all communications to and from the main radar station and the two transponder stations 2 and 3 are by way of the transponder in flight, the paths over which these signals travel are always predetermined. The slant range from antenna 11 to object T is immediately determined by the time of arrival of the radar return signal ST and the lengths of the paths R2 and R3 are directly obtainable from the time differences between the arrival of signals S2T and S3T and the signal ST. From these instantaneous position data, the transverse velocity components are derivable by conventional computer means well known to those skilled in this art.

It will be readily appreciated that, when the range R1 is large, considerable change in transverse position and velocity may take place which cannot be determined accurately from the radar station 1 because the angular deviations vary inversely as the range increases. The advantage in the use of the two transponder stations 2 and 3 in providing the distances R2 and R3 was pointed out in the copending application and can be readily appreciated by inspection of FIG. 1.

The data received by radar station 1 is illustrated in FIG. 2. Here the transmitted signal S1 is assumed to have been emitted at zero time. At time $t_1$ later the signal ST is received. This time represents the time required for the round trip from the radar station to the object T and, as is well known, represents the distance R1 in FIG. 1. At time $t_2$ signal S2T is received from the transponder in flight. It will be remembered that this signal was initiated by the receipt of signal S2 from transponder station 2 and, consequently, this time represents the round trip from radar station 1 to transponder 2 by way of the object in flight. Therefore, time $t_2$ is representative of the sum of the distances R1 and R2 shown in FIG. 1. From the difference between time $t_2$ and time $t_1$ the computer readily derives the distance R2 by conventional means. Similarly, time $t_3$ represents the arrival of signal S3T and is representative of the sum of the distances R1 and R3 in FIG. 1. From these data and the known spatial relationship of the ground stations, the computer can derive not only distances R2 and R3 but their rate of change as well as the transverse velocity components of object T. As this data processing in the computer is conventional practice, further description thereof is not required for an understanding of this invention.

While most radar computers are tailormade for their special task and contain more or less fixed programs, the mathematical expressions they must solve can be solved by most any commercially available computer, for example, the IBM 7090. For the purposes of this invention the computer is not called upon to perform any function differing in kind from those normally performed either by the conventional radar computers or by the commercially available ones. All tracking and guidance radars regularly obtain such data as elevation angle, azimuth angle and line-of-sight transmission time. In the present case, the round trip transmission time to the object T is $t_1$ and because of the transponders in the object T and in stations 2 and 3, transmission times $t_2$ and $t_3$ are also obtained. The relative simplicity of the computations to be performed may be illustrated by considering the type of mathematical expressions to be solved.

Referring to FIGS. 1 and 4, the distance between stations 1 and 2 may be represented by the letter A, the distance between stations 1 and 3 by the letter B and the fixed angle between the lines A and B by the angle $\theta$. A, B and $\theta$ are accurately established by survey. The position of the antenna of station 1 determines angle $\alpha$ which represents the angle between line A and the projection of the line-of-sight distance R1 to the ground plane as shown in FIG. 4. The geometry problem presented by FIG. 1 is quite readily solved by anyone skilled in this art and the solution will show the relations between the line-of-sight distances and the time intervals $t_1$, $t_2$ and $t_3$ to be those given in expression (1) below, where C is the velocity of light:

$$R_1 = (C/2)t_1$$
$$R_2 = (C/2)(t_2-t_1) \quad (1)$$
$$R_3 = (C/2)(t_3-t_1)$$

In the above expressions, the line-of-sight distances $R_1$, $R_2$ and $R_3$ are all functions of time so that by simply differentiating them with respect to time, the corresponding instantaneous velocities $\dot{R}_1$, $\dot{R}_2$, $\dot{R}_3$ are obtained. These operations are of the same kind as are conventionally performed in all radar computers. In accordance with this invention these data, taken with the radar angle data and the above-described survey data, are further processed in the computer, again in perfectly conventional manner, to obtain the two transverse velocity components. It may appear that the horizontal transverse angular velocity $\dot{\alpha}$ can be gotten by simply differentiating the azimuth angle $\alpha$ but, as previously pointed out, the accuracy realizable from obtaining the velocity in this manner is not good when the distance from station 1 to object T is large. While the usual data smoothing process in conventional radar computers does give very good values for the angle $\alpha$ on a long-term basis, the instantaneous rate of change of this angle is not so accurately obtained because the smoothing process, which takes time, precludes an up-to-date rate determination by that method. However, this invention takes advantage of the times $t_2$ and $t_3$ and the resulting corresponding distances R2 and R3, so that the accuracy is considerably improved. In addition to expression (1), the solution of the geometry problem of FIG. 1 will also show that the horizontal transverse angular velocity $\dot{\alpha}$ is:

$$\dot{\alpha} = \frac{2\{A[R_3\dot{R}_3 - R_1\dot{R}_1]\cos\alpha + B[R_1\dot{R}_1 - R_2\dot{R}_2]\cos(\theta-\alpha)\}}{A[R_3^2 - R_1^2 - B^2]\sin\alpha + B[R_2^2 - R_1^2 - A^2]\sin(\theta-\alpha)} \quad (2)$$

Consequently, the horizontal transverse velocity component is simply equal to $(R_1 \cos \epsilon) \dot{\alpha}$, where $\epsilon$ is the smoothed elevation angle supplied by radar station 1 as illustrated in FIG. 4. In the above expression, distances $R_1$, $R_2$ and $R_3$ are accurately obtainable from the times $t_1$, $t_2$ and $t_3$ by programming the computer to perform the very simple operations of expression (1) described above while A, B and $\theta$ are very accurately determined by survey as previously described. Velocities $\dot{R}_1$, $\dot{R}_2$ and $\dot{R}_3$ are very simply derived by the computer from the three transmission times in the manner described above. The angle $\alpha$ is the smoothed value of the azimuth angle derived by the computer in the same manner as is the azimuth angle in all conventional radar computers.

The remaining transverse angular velocity is $\dot{\epsilon}$ which can be shown to be:

$$\dot{\epsilon} = \frac{2A^2R_1\dot{R}_1\cos^2\epsilon - (A^2+R_1^2-R_2^2)(R_1\dot{R}_1 - R_2\dot{R}_2)}{2A^2R_1^2 \sin\epsilon \cos\epsilon}$$
$$\frac{-2AR_1\cos\epsilon\sin\alpha/\sin\theta[(A/B)(R_1\dot{R}_1 - R_3\dot{R}_3) - \cos\theta(R_1\dot{R}_1 - R_2\dot{R}_2)]}{2A^2R_1^2\sin\epsilon\cos\epsilon} \quad (3)$$

The corresponding transverse velocity component is $R_1\dot{\epsilon}$ and since $\dot{R}_1$ is obviously the radial velocity component, all three of the orthogonally related velocity components are obtained from the computer. While expressions (2) and (3) seem somewhat formidable for manual computation, their operations are easily and rapidly performed by any commercially available computer as, for example, the IBM 7090 computer previously mentioned.

The above three expressions can be further refined, if desired, to take into account the motion of object T during the transit times of the radar beams. The resulting expressions are derived without the use of any additional data and refer all parameters to those which define the position of the object T at a known reference time, for example, the instant the radar pulse is emitted from station 1.

From the foregoing description, it will be evident that this invention retains the advantages of the invention in the copending application and has additional advantages. Among these are that this invention requires no ground communications between the ground guidance stations and the down range stations have been reduced to extreme simplicity by being required to act only as simple transponders. This increased simplicity results in an increase in reliability.

As previously stated, the various signals may be characterized in different ways. They may be distinguished by reason of having different frequencies, they may be distinguished by various distinctive types of pulse modulation, or they may be distinguished by the time order by which they are received. The latter is useful in the special case where the previous history of the flying object, as determined by the main radar station 1, is such that it is known which of the two transponder signals from stations 2 and 3 will be received first.

A block diagram of the transponder circuitry which may be used in the object T is shown in FIG. 3. This is illustrative of the type in which a known form of pulse modulation is employed. Also shown in FIG. 3 is a particular form of pulse signal S1 which may be emitted from radar station 1. This signal comprises two pairs of pulses, the pulses in each pair being separated by a time $D_T$. In this art, these pulses are frequently referred to as address pulses. These two pairs of pulses are, in turn, separated by a time interval $D_1$ which determines the message that is to be transmitted. This signal is received by the transponder antenna, amplified by amplifier 4 and is transmitted by the address gate 6. Cooperating with this gate is a delay unit 5 which delays the first of each pair of signals by exactly the time $D_T$ so that both the delayed signal and the second signal of the pair arrive at the two input terminals of the address gate 6 at the same time, thereby resulting in the transmission of a single pulse. At a time $D_1$ later, the second pair of pulses are received by this gate resulting in the two pulses separated by time $D_1$ shown at the output of gate 6.

In a manner similar to that described for gate 6, gate 8 and its delay unit 7 recognize these two pulses and forward a signal to amplifier 13 which causes the transponder to emit a characteristic signal $S_T$. This signal may again be in a pulse code form which may be recognized by an address gate in all three ground stations by a circuit similar to gate 6 in FIG. 3. Since the delay times of delay circuits 7, 9 and 11 are all different, gates 10 and 12 will transmit no signals in response to signal S1 and consequently signals S2T and S3T are not emitted at this time.

In a similar manner signal S2 from transponder station 2 will have two pairs of address pulses identical to that shown for signal S1 in FIG. 3. However, these two pairs of pulses will be separated by a time interval $D_2$ instead of $D_1$ so that when this signal arrives at the output of gate 6 the two pulses of the signal will be separated by a time $D_2$, the delay time of delay unit 9. Also in a manner similar to that described for gate 8, gate 10 will cause amplifier 14 to transmit signal S2T. Gate 12 and amplifier 15 transmit signal S3T upon receiving a signal S3 from transponder station 3 having its two pairs of address pulses separated by a time interval $D_3$, the delay time of delay unit 11. By this means it will be evident that each signal transmitted by the transponder in flight is characteristic of the origin of the signal which caused the transponder to operate.

For convenience of illustration in FIG. 3, four antenna structures are symbolically indicated. It is preferable that only a single omni-directional antenna structure be used although it is also well known in this art that either a separate receiving and a single transmitting antenna may be used or four separate antennas may be used.

Circuit structures for transponders 2 and 3 are not described but they too may take on conventional circuitry of the type described in FIG. 3. Signal identification at the radar 1 may employ the same principles.

While this invention has been described with reference to the particular type of pulse modulation shown in FIG. 3, it will be recognized by those skilled in this art that the invention is not limited thereto, nor is the invention limited to any one of the several types of radars conventionally used for this purpose. Therefore, many modifications may be made by those skilled in the art without departing from the scope of this invention.

What is claimed is:

1. A radar system for obtaining data for determining the transverse velocity components of an object in flight, said system comprising radar means for emitting radar signals to the object in flight and for receiving return signals therefrom, means to be carried in said object for emitting a signal in response to the radar signal, two transponders disposed in known spatial relationship with said radar means, means in each transponder for emitting a signal in response to the signal from said object, and further means in said object for relaying the signals from said transponders to said radar means, whereby said radar may derive the transverse velocity components from the several signals received from said object.

2. The combination of claim 1 wherein each of said signal emitting means includes means for originating a characteristic signal distinguishable from those from all other emitting means.

3. The combination of claim 2 wherein said further means in said object for relaying signals includes means for differently characterizing said relayed signals.

4. A radar system for obtaining data for determining the transverse velocity components of an object in flight, said system comprising a radar and two transponders disposed in known spatial relationship, a third transponder to be carried by the object in flight, said third transponder being so constructed and arranged as to emit a signal in response to a signal from said radar, said radar and said two transponders being adapted to receive said third transponder signal, said two transponders being so constructed and arranged as to emit signals in response to the signal received from said third transponder, said third transponder being further so constructed and arranged as to relay the signals from said two transponders to said radar, whereby said radar may derive the transverse velocity components from the several signals received from the third transponder.

5. A radar system for obtaining data for determining the transverse velocity components of an object in flight, said system comprising a radar for emitting signals to said object and having computer means for processing signal data received therefrom, two transponders disposed in known spatial relationship with said radar, a third transponder to be carried by the object in flight, said third transponder including means to emit a signal in response to a signal from said radar, means in said radar and in said two transponders for receiving the signal from said third transponder, means in each of said two transponders for emitting a signal in response to the one from said third transponder, and means also in said third transponder to relay the signals from said two transponders to said radar, whereby computer means in said radar may derive the transverse velocity components from the several signals received from said third transponder.

6. The combination of claim 5 wherein the emitting means in said radar and in all three of the transponders includes means for emitting characteristic signals, each distinctive of its origin.

7. The combination of claim 6 wherein the means in said third transponder for relaying signals from said two transponders includes means for differently characterizing said relayed signals so that they may be distinguished when received by said radar.

No references cited.

MAYNARD R. WILBUR, *Acting Primary Examiner.*
CHESTER L. JUSTUS, *Examiner.*